(12) United States Patent
Kajimura

(10) Patent No.: US 8,169,529 B2
(45) Date of Patent: May 1, 2012

(54) APPARATUS AND METHODS FOR PERFORMING LIGHT METERING IN AN IMAGING APPARATUS

(75) Inventor: Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/495,814

(22) Filed: Jul. 1, 2009

(65) Prior Publication Data
US 2010/0002109 A1    Jan. 7, 2010

(30) Foreign Application Priority Data

Jul. 3, 2008   (JP) ................................. 2008-174559

(51) Int. Cl.
*H04N 5/225* (2006.01)
(52) U.S. Cl. .................................. 348/341; 348/333.01
(58) Field of Classification Search ............ 348/333.01, 348/333.02, 341
See application file for complete search history.

(56) References Cited

U.S. PATENT DOCUMENTS 5,485,002 A * 1/1996 Kusaka ...................... 250/201.8
2006/0127080 A1 * 6/2006 Mori et al. .................... 396/121
2007/0222883 A1 * 9/2007 Iwauchi ................... 348/333.01
2007/0280673 A1 * 12/2007 Mikami et al. ............... 396/354
2010/0295963 A1 * 11/2010 Shintani ..................... 348/222.1

FOREIGN PATENT DOCUMENTS

JP            6-282004 A    10/1994

* cited by examiner

*Primary Examiner* — Gevell Selby
(74) *Attorney, Agent, or Firm* — Carter, DeLuca, Farrell & Schmidt LLP

(57) ABSTRACT

An imaging apparatus includes an image sensor configured to capture an image of a subject, a finder optical system configured to enable a photographer to optically observe the subject, a light-metering unit configured to perform a light-metering operation for a light flux that enters the finder optical system, an image display unit disposed in the finder optical system and configured to display an image of the subject captured by the image sensor and to enable the photographer to observe an image of the subject captured by the image sensor when the photographer looks in the finder optical system, and a control unit configured to prevent the image display unit from performing the display of the image when the light-metering unit performs the light-metering operation.

4 Claims, 11 Drawing Sheets

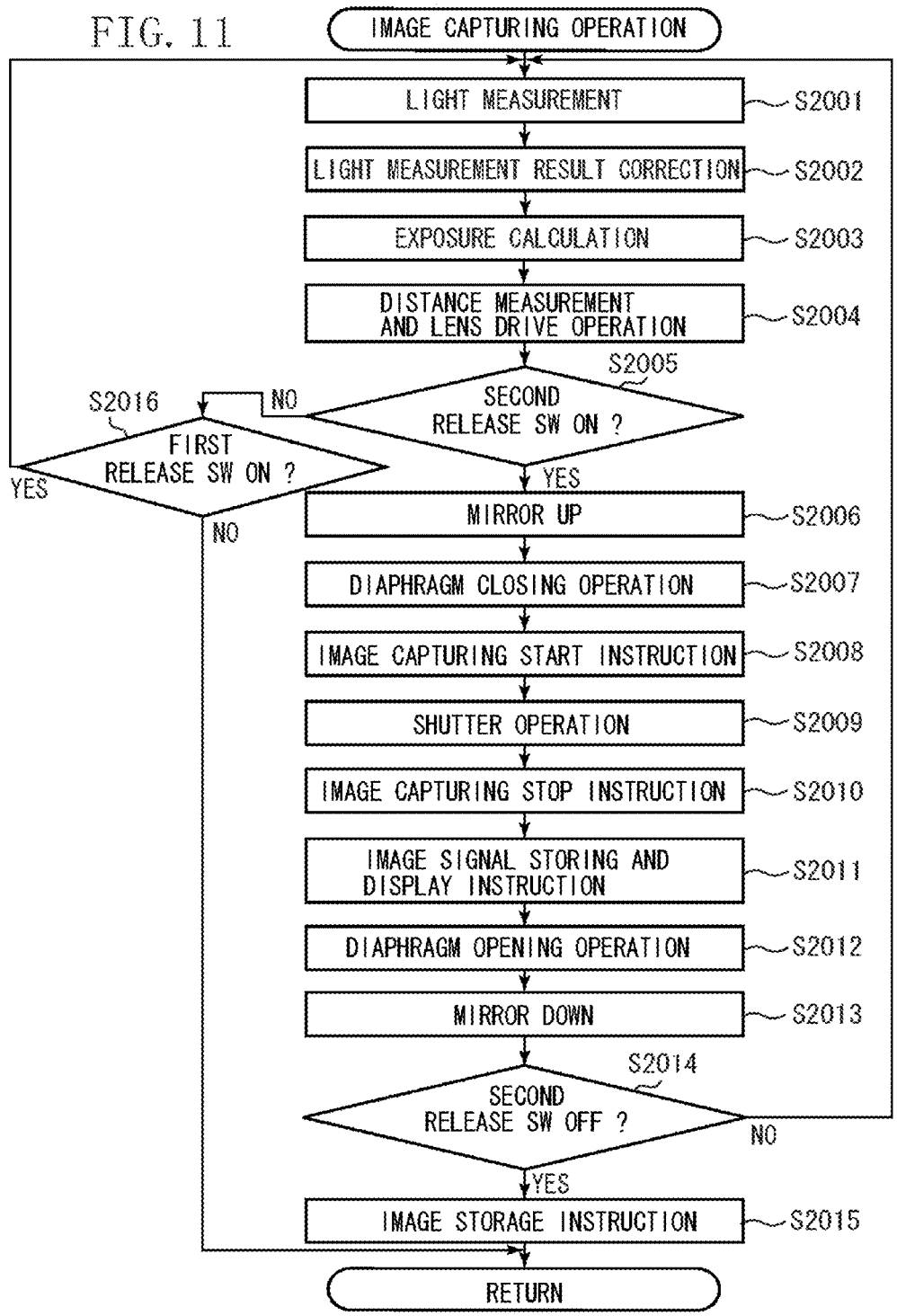

APPARATUS AND METHODS FOR PERFORMING LIGHT METERING IN AN IMAGING APPARATUS

BACKGROUND OF THE INVENTION

1. Field of the Invention

The present invention relates to an imaging apparatus that can capture an electronic image.

2. Description of the Related Art

As discussed in Japanese Patent Application Laid-Open No. 06-282004, there is a conventional camera that enables a photographer to know a rate of an image-capturing screen occupied by an area having calculated adequate exposure value and approximately adequate exposure value when the photographer looks in a finder.

The above-described camera is configured to display an object image on a focusing screen of the finder and also display exposure conditions (e.g., subject luminance distribution, shutter speed, and diaphragm state) of the camera on separate display units positioned near the finder. The camera can divide the object image into a plurality of segments in a two-dimensional matrix pattern and measure the luminance in each segment. A central processing unit (i.e., CPU) provided in the camera can process the measured luminance data.

A histogram, which can be displayed by the display unit of the camera, includes a central portion indicating the number of segments whose luminance is optimum for the designed exposure conditions, a right side indicating the number of segments having higher luminance values, and a left side indicating the number of segments having lower luminance values.

According to the camera discussed in Japanese Patent Application Laid-Open No. 06-282004, a relatively large display apparatus is provided near the focusing screen. The camera includes a light-metering element that can measure a subject image formed on the focusing screen. However, if the image displayed on the display apparatus is a photographic image having a higher luminance, a light-metering result may be influenced significantly.

SUMMARY OF THE INVENTION

The present invention is directed to an imaging apparatus including a finder that enables users to confirm a subject based on an optical image of the subject while observing a previously captured image. The imaging apparatus according to the present invention can obtain an appropriate light-metering result.

According to an aspect of the present invention, an imaging apparatus includes an image sensor configured to capture an image of a subject, a finder optical system configured to enable a photographer to optically observe the subject, a light-metering unit configured to perform a light-metering operation for a light flux that enters the finder optical system, an image display unit disposed in the finder optical system and configured to display an image of the subject captured by the image sensor and to enable the photographer to observe an image of the subject captured by the image sensor when the photographer looks in the finder optical system, and a control unit configured to prevent the image display unit from performing the display of the image when the light-metering unit performs the light-metering operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 is a flowchart illustrating a procedure of an image capturing operation that can be performed by the digital single lens reflex camera according to the second exemplary embodiment after the release button is half pressed.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

An imaging apparatus according to an exemplary embodiment can be applied to a digital single lens reflex camera. The digital single lens reflex camera according to the present exemplary embodiment is a still camera that can capture an object image (i.e., a subject image) with an image sensor, such as a complementary metal oxide semiconductor (i.e., CMOS) or a charge coupled device (i.e., CCD). The digital single lens reflex camera includes a release button provided on an outer casing of the camera, which enables users to instruct execution of an image capturing operation.

The camera includes, as a shooting mode, a continuous shooting mode according to which the camera repetitively performs the image capturing operation if the release button is continuously pressed. The camera causes a subject image observation movable mirror to retreat from an imaging optical path while a user is operating the release button in a state where the continuous shooting mode is selected. In the image capturing operation repetitively performed by the camera, the object image (i.e., the subject image) can be photoelectrically converted into an electronic image.

Figure 1:
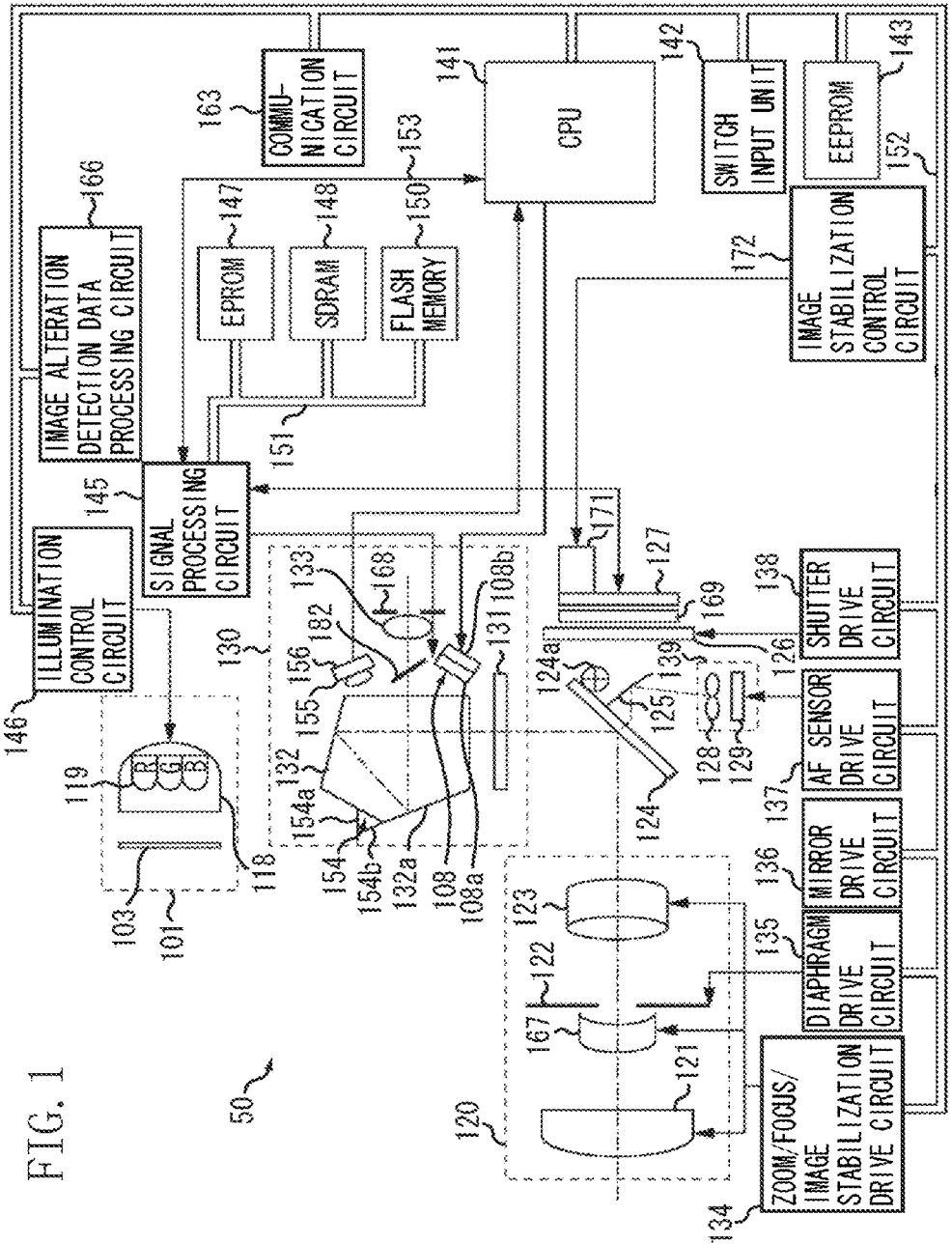
FIG. 1 illustrates a configuration of an electric circuit of a digital single lens reflex camera according to a first exemplary embodiment of the present invention.

FIG. 1 illustrates an example configuration of an electric circuit of a digital single lens reflex camera according to a first exemplary embodiment.

A digital single lens reflex camera 50 includes a CPU 141 that can control various operation sequences of the camera, an illumination unit 101, a photographic lens 120, a movable mirror 124, a shutter 126, and an image sensor 127. The image sensor 127 includes a rectangular image capturing unit that has an aspect ratio of 3:2.

The digital single lens reflex camera 50 further includes a finder apparatus 130, a focus detection apparatus 139, a zoom/focus/image stabilization drive circuit 134, a diaphragm drive circuit 135, a mirror drive circuit 136, and an AF sensor drive circuit 137. The digital single lens reflex camera 50 further includes a shutter drive circuit 138, an image stabilization control circuit 172, an image alteration detection data processing circuit 166, and a communication circuit 163.

The image stabilization control circuit 172 can adjust the position of the image sensor 127 to prevent the shake of an image. The communication circuit 163 includes a circuit dedicated to, for example, wireless communications or infrared communications. If the communication circuit 163 is dedicated to the infrared communications, the communication circuit 163 can communicate with a portable phone using a relatively small amount of data.

The digital single lens reflex camera 50 further includes a switch input unit 142, an electrically erasable and programmable read only memory (i.e., EEPROM) 143, a signal processing circuit 145, an illumination control circuit 146, an erasable programmable read only memory (i.e., EPROM) 147, a synchronous dynamic random access memory (SDRAM) 148, and a flash memory 150.

The photographic lens 120 includes a plurality of lens groups 121, 167, and 123 and a diaphragm mechanism 122 provided between the lens groups 167 and 123. The zoom/focus/image stabilization drive circuit 134 can drive the lens groups (i.e., the lens groups 121, 167, and 123). The diaphragm drive circuit 135 can drive the diaphragm mechanism (hereinafter, simply referred to as "diaphragm") 122.

The movable mirror 124 is positioned behind the lens groups (i.e., the lens groups 121, 167, and 123). The movable mirror 124 includes a half mirror and its holding mechanism. The movable mirror 124 is movable between a mirror-down position (which can be referred to as a first position) and a mirror-up position (which can be referred to as a second position).

In an exposure operation (i.e., an image capturing operation), the movable mirror 124 can rotate around a stationary axis 124a and move upward from the first position toward a focusing screen 131 and reach the second position (i.e., the mirror-up position). As a result, the movable mirror 124 can retreat from the imaging optical path. A sub mirror 125 is a concave mirror, which is provided on a back surface of the movable mirror 124 at the center thereof. The sub mirror 125 can reflect object light downward as understood from the drawing.

An image re-forming optical system 128, provided at a lower part of a reflection optical axis of the sub mirror 125, can perform image separation with two lenses. An AF sensor 129 is provided at an image-forming position of a subject image formed by the image re-forming optical system 128. The AF sensor 129 is connected to the AF sensor drive circuit 137.

The sub mirror 125, the image re-forming optical system 128, and the AF sensor 129 cooperatively configure the focus detection apparatus 139. The focus detection apparatus 139 can detect an image-forming state of a subject on a plurality of positions on the image sensor 127 according to a conventional phase difference detection method.

The zoom/focus/image stabilization drive circuit 134 includes a driving source (e.g., an electromagnetic motor or an ultrasonic motor), a driver circuit that can control the driving source, and an encoder apparatus that can detect the position of the lens.

The zoom/focus/image stabilization drive circuit 134 can perform zoom control and focus control for adjusting the position of the lens groups (i.e., the lens groups 121, 167, and 123) in the optical axis direction. The zoom/focus/image stabilization drive circuit 134 can further perform image stabilization control for moving the position of the lens 167 in a direction perpendicular o the optical axis.

A finder optical system is provided on a reflection optical path of the movable mirror 124. The finder optical system includes the focusing screen 131, a pentagonal prism 132 made from optical glass, and an eyepiece lens 133. The finder apparatus 130 includes a liquid crystal display device 108, a prism 154, a light-metering lens 155, and a light-metering sensor 156, in addition to the finder optical system.

The movable mirror 124 reflects the object light (i.e., incident light) having transmitted through the lens groups (i.e., the lens groups 121, 167, and 123) of the photographic lens 120. An image of the reflected light is formed on the focusing screen 131. A photographer can visually recognize the optical object image (i.e., the optical image) formed on the focusing screen 131 from a single eyepiece window 168 via the pentagonal prism 132 and the eyepiece lens 133. In this case, the photographer can observe the optical image without substantial time delay.

The light-metering sensor 156 is capable of performing light measurement. Namely, the light-metering sensor 156 detects a brightness of the object image on the focusing screen 131 via the light-metering lens 155. The light-metering sensor 156 and the light-metering lens 155 are positioned on a light measuring axis, which is offset from an observation optical axis of the eyepiece lens 133, in the finder apparatus 130.

The light-metering sensor 156 is constituted by a plurality of photodiodes that constitute divided light-receiving surfaces. The photodiodes of the light-metering sensor 156 respectively generate luminance outputs. The CPU 141 performs calculations according to a distance measuring position on the focusing screen 131 that can be controlled by the focus detection apparatus 139. The CPU 141 obtains subject luminance information (i.e., BV value) to perform exposure control based on the calculation result.

The shutter 126, a filter 169 (e.g., an optical low-pass filter or an infrared cut filter), and the image sensor 127 (e.g., a CCD imager or a CMOS imager) are positioned behind the movable mirror 124. The camera 50 further includes a dust-proof mechanism (not illustrated) that can mechanically vibrate the filter 169 to accelerate and remove foreign particles from the filter surface.

The shutter drive circuit 138 can drive the shutter 126 to open for a predetermined time corresponding to a shutter speed. When the shutter 126 is in an opened state, the object image can be guided to the light-receiving surfaces of the image sensor 127. The movable mirror 124, when it is driven by the mirror drive circuit 136, can retreat from the optical axis of the photographic lens 120 upward and reach the second position, while the shutter 126 is driven by the shutter drive circuit 138 and set in an open state.

Therefore, the object image can be guided to the light-receiving surfaces of the image sensor 127. The camera performs an image capturing operation. In this state, an image stabilization mechanism 171, which is connected to the image stabilization control circuit 172, can shift and rotate the image sensor 127 in a predetermined direction to cancel the blur of an image. Thus, the image stabilization mechanism 171 can prevent the image from shifting undesirably and lowering the resolution.

The image stabilization mechanism 171 is adjacent to the image sensor 127 and far from a division point of the optical path that extends to the finder apparatus 130. Therefore, Therefore, a photographer cannot check the change of the composition due to the shift or the rotation of the image sensor 127 via the finder apparatus 130.

The CPU 141 is connected, via a data bus 152, to the zoom/focus/image stabilization drive circuit 134, the diaphragm drive circuit 135, the mirror drive circuit 136, and the AF sensor drive circuit 137. The CPU 141 is further connected, via the data bus 152, to the shutter drive circuit 138, the image stabilization control circuit 172, and the communication circuit 163.

The CPU 141 is further connected, via the data bus 152, to the image alteration detection data processing circuit 166 and the illumination control circuit 146. The CPU 141 is further connected, via the data bus 152, to the switch input unit 142 and the EEPROM 143 (nonvolatile memory).

The switch input unit 142 includes a first release switch and a second release switch. The first release switch is turned on when the release button (not illustrated) provided on the outer casing of the camera is half pressed. The second release switch is turned on when the release button is fully pressed.

The switch input unit 142 further includes a switch operable in conjunction with a power switch of the camera and a plurality of switches (e.g., mode switches) operable by various mode buttons of the camera. The switch input unit 142 can supply an operation signal to the CPU 141 based on each switch operation.

The EEPROM 143 is a nonvolatile semiconductor memory. The EEPROM 143 may store adjustment values for each camera that are required in production processes to eliminate differences between individual cameras to be delivered. The EEPROM 143 may store coefficient data that can define a relationship between the BV value and the light quantity of the backlight, referring to which the CPU 141 can determine the light quantity of the backlight 108b based on an output of the light-metering sensor 156.

The CPU 141 controls the AF sensor drive circuit 137 in response to a turning-on state of the first release switch and calculates a distance between two images on the AF sensor 129. The CPU 141 controls the zoom/focus/image stabilization drive circuit 134 based on the calculated distance data and performs focus adjustment for the photographic lens 120.

The CPU 141 controls the mirror drive circuit 136 in response to a turning-on state of the second release switch, to cause the movable mirror 124 to retreat from the optical axis to the second position. In addition to the above-described retreat control, the CPU 141 obtains an adequate diaphragm value, a shutter time, and an image sensor sensitivity based on the subject luminance information that can be obtained based on an output of the light-metering sensor 156.

The CPU 141 causes the diaphragm drive circuit 135 to drive the diaphragm mechanism 122 based on the obtained diaphragm value. The CPU 141 causes the shutter drive circuit 138 to drive the shutter 126 based on the obtained shutter speed. The CPU 141 further determines a current amount to be supplied to the backlight 108b referring to the coefficient data stored in the EEPROM 143 that define the relationship between the BV value and the light quantity of the backlight. Then, the CPU 141 obtains an appropriate quantity of light that is required to visually recognize an image.

In a state where the shutter 126 is opened, a subject image is formed on the light-receiving surfaces of the image sensor 127. The object image is converted into an analog image signal and is then converted into a digital image signal by the signal processing circuit 145.

The signal processing circuit 145 includes a reduced instruction set computer (RISC) processor, a color processor, and a Joint Photographic Experts Group (JPEG) processor. The signal processing circuit 145 performs image processing (e.g., compression/expansion processing, white balance processing, and edge enhancement processing) on a digital image signal. The signal processing circuit 145 further performs conversion processing for a composite signal (e.g., a luminance signal, a color-difference signal, etc.) to be output to the liquid crystal display device 108.

The CPU 141 and the signal processing circuit 145 are connected to each other via a communication line 153, to perform transmission/reception of a control signal (e.g., an image signal input timing signal) and data via the communication line 153.

The composite signal generated by the signal processing circuit 145 is output to the liquid crystal display device 108 of the finder apparatus 130. The liquid crystal display device 108 displays an electronic subject image. The liquid crystal display device 108 is positioned between the pentagonal prism 132 and the eyepiece lens 133.

The liquid crystal display device 108 includes a liquid crystal display (LCD) element 108a and the backlight 108b. The (LCD) element 108a is a display element that can display a color image. The backlight 108b illuminates a display surface of the LCD 108a from the rear side. The backlight 108b may be constituted by a white light-emitting diode (LED).

Figure 3:
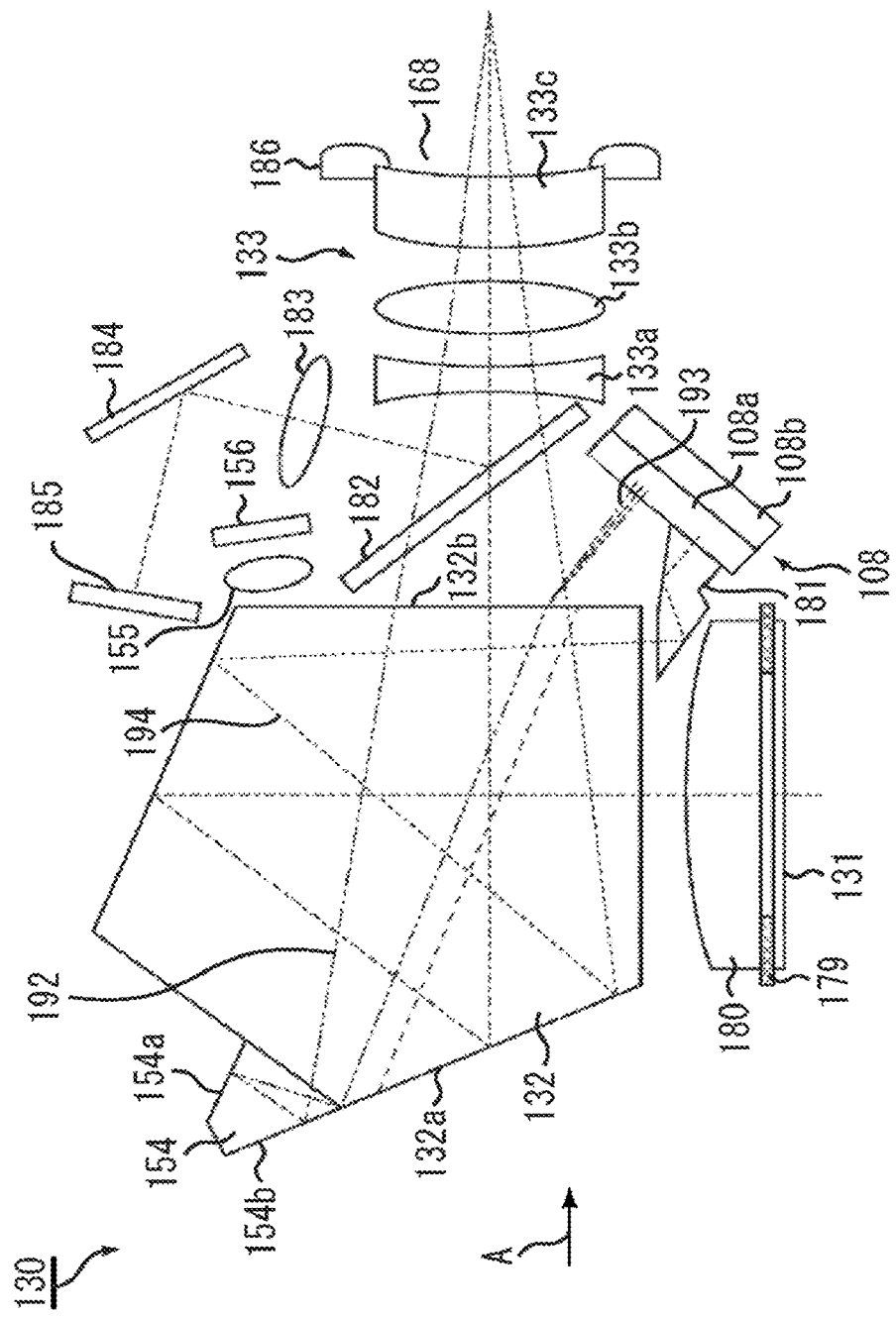
FIG. 3 is a cross-sectional view illustrating a configuration of a finder apparatus.

The pentagonal prism 132 includes a surface 154b that forms a flat surface continuously extending from a third reflection surface 132a (see FIG. 3). The pentagonal prism 132 and the prism 154 have the same refractive index and are bonded together with an adhesive selected according to the index matching.

The light beam (i.e., light flux) emitted from the liquid crystal display device 108 reflects twice on the inner surfaces of the prism 154 and can reach the eyepiece lens 133. In this case, a surface 154a has an appropriate curvature so that the display surface of the LCD 108a of the liquid crystal display device 108 can be optically equivalent to the position of the focusing screen 131.

An image displayed on the LCD 108a can be observed through the eyepiece window 168 even when the movable mirror 124 is positioned at the first position or the second position. The brightness of the image to be displayed on the LCD 108a can be adjusted to an appropriate value by controlling the amount of current supplied to a white LED (i.e., the backlight 108b).

The signal processing circuit 145 is connected to the EPROM 147, the SDRAM 148, and the flash memory 150 via the data bus 151.

The EPROM 147 stores a program that can be executed by the processor (i.e., CPU) provided in the signal processing circuit 145. The SDRAM 148 is a volatile memory that can temporarily store image data that may be subjected to the image processing and image data that are currently subjected to the image processing.

The flash memory 150 is a nonvolatile memory that can store finalized image data. The SDRAM 148 has the capability of performing a high-speed operation although its storage content disappears when the electric power supply is stopped. On the other hand, the flash memory 150 performs a low-speed operation and can hold its storage content even when a power source of the camera is turned off.

The illumination unit 101 includes a light-emitting panel 103, a reflector 118, and three high brightness LED 119 of RGB colors. The emitted light can pass directly, or via the reflector 118, through the light-emitting panel 103 and can reach a subject. The illumination unit 101 includes a built-in battery (not illustrated) that can activate the communication circuit even in a state where the illumination unit 101 is taken out of the camera body.

More specifically, the illumination unit 101 is configured to communicate with the camera body (i.e., the camera 50) via the communication circuit 163 according to, for example, the UWB standard, so that the illumination unit 101 can be remote controlled by the camera body. The illumination control circuit 146 determines a light quantity balance of respective RGB colors under the control of the CPU 141 and controls a light-emission instruction that may be supplied to the high brightness LED 119.

Figure 2:
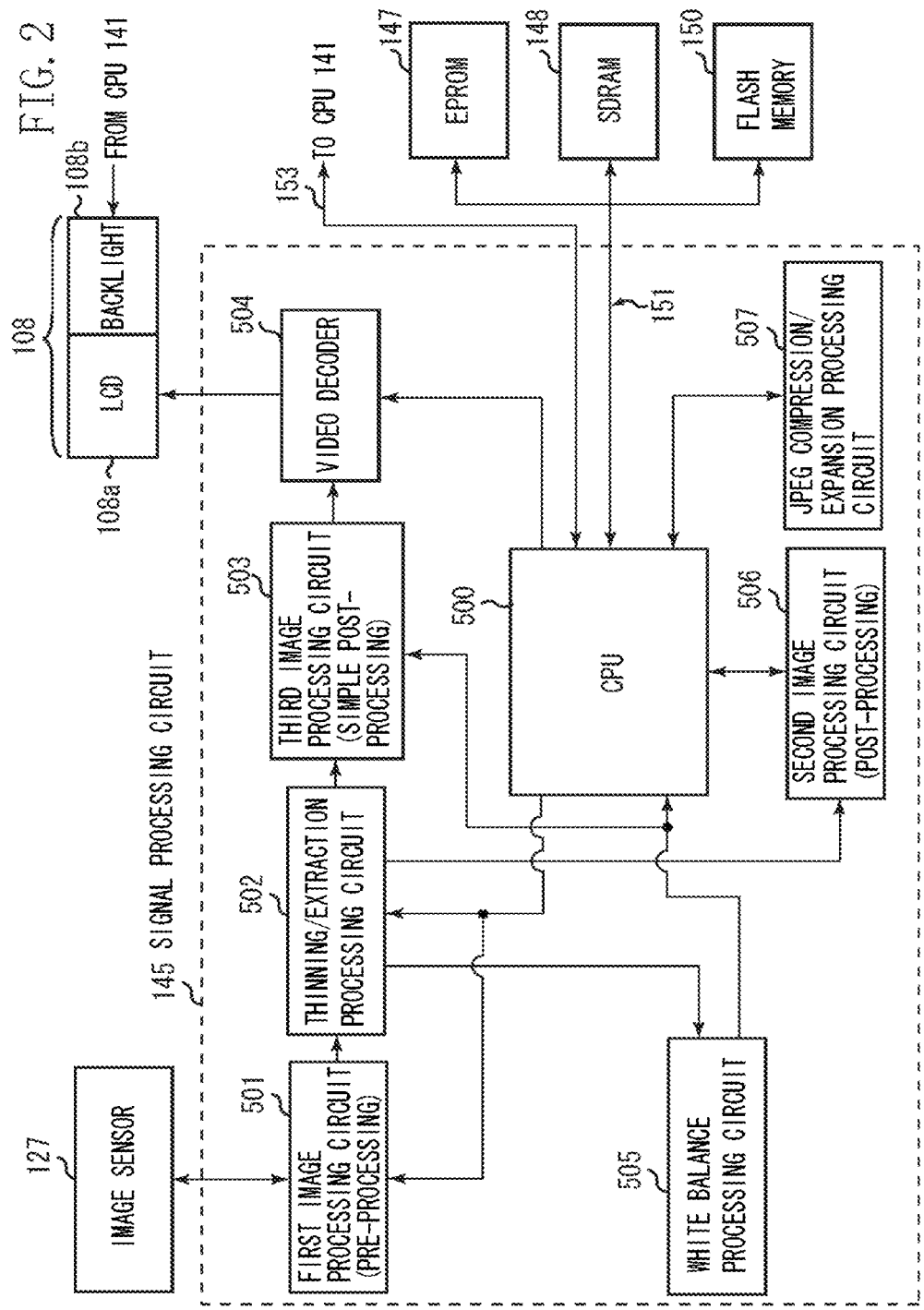
FIG. 2 is a block diagram illustrating an example electric circuit usable as a signal processing circuit and a peripheral circuit connected to the circuit.

FIG. 2 is a block diagram illustrating an example electric circuit usable as the signal processing circuit 145 and a peripheral circuit connected to the circuit. The signal processing circuit 145 includes a CPU 500 and a plurality of circuits that can operate according to a control signal supplied from the CPU 500. The CPU 500 can serve as a display control circuit capable of controlling a signal processing operation and an image processing control circuit.

The CPU 500 is connected to the CPU 141 (i.e., the central processing unit dedicated to a camera sequence control) via the communication line 153. The CPU 500 can control each circuit in the signal processing circuit 145 according to a control signal supplied from the CPU 141.

More specifically, the signal processing circuit 145 includes a first image processing circuit 501, a thinning/extraction processing circuit 502, a second image processing circuit 506, and a third image processing circuit 503.

The signal processing circuit 145 further includes a video decoder 504, a white balance processing circuit 505, and a JPEG compression/expansion processing circuit 507.

The first image processing circuit 501 is a pre-processing circuit configured to drive the image sensor 127 according to drive conditions that can be set by the CPU 500 and perform A/D conversion for generating a digital image signal from an analog image signal entered from the image sensor 127. The first image processing circuit 501 can further correct the digital image signal based on a pixel signal obtained from a light-shielding portion of the image sensor 127.

The thinning/extraction processing circuit 502 can perform thinning processing on the digital image signal, which is generated from the first image processing circuit 501. The thinning/extraction processing circuit 502 can output a processed signal to the second image processing circuit 506 and the third image processing circuit 503.

The thinning processing is processing for lowering the resolution of a processed image. The digital image signal output to the third image processing circuit 503 is a signal of an electronic subject image that can be displayed on the liquid crystal display device 108.

The CPU 500 can instruct a degree of the thinning processing performed on the digital image signal output to the second image processing circuit 506 according to a resolution having been set by a user. The CPU 500 can further instruct the degree of the thinning processing performed on the digital image signal output to the third image processing circuit 503 according to an appropriate resolution for the image display.

The thinning/extraction processing circuit 502 can further extract part of the above-described digital image signal and output the extracted signal to the white balance processing circuit (hereinafter, referred to "WB processing circuit") 505. The CPU 141 can instruct a method for extracting the digital image signal.

The WB processing circuit 505 is a circuit that can output white balance information (i.e., WB information) to adjust a color balance (i.e., a white balance) of an image. The WB processing circuit 505 can send the WB information directly to the third image processing circuit 503 and via the CPU 141 to the second image processing circuit 506.

The third image processing circuit 503 is a circuit that can generate image to be displayed on the liquid crystal display device 108. The third image processing circuit 503 can serve as a simple post-processing circuit configured to perform predetermined processing on the above-described digital image signal. The processing performed by the third image processing circuit 503 includes γ correction, reduction in data bit number, color adjustment based on the WB information, and conversion from a RGB signal into a YCbCr signal.

In general, software processing may not be speedy enough to repetitively display captured images on the liquid crystal display device 108. Therefore, the third image processing circuit 503 uses a hardware configuration for processing images to be displayed.

The video decoder 504 can form an electronic subject image by converting the YCbCr signal (i.e., the above-described digital image signal) into an NTSC signal, and causes the liquid crystal display device 108 to display the electronic subject image on the LCD 108a. The backlight 108b illuminates the display surface of the LCD 108a from the rear side with a quantity of light determined by the CPU 141.

The second image processing circuit 506 is a circuit that can generate the above-described digital image signal for storing in the flash memory 150. The second image processing circuit 506 serves as a post-processing circuit configured to perform predetermined processing. The processing performed by the second image processing circuit 506 includes γ correction, reduction in data bit number of the above-described digital image signal, color adjustment based on the WB information, conversion from a RGB signal into a YCbCr signal, defect pixel correction for the image sensor 127, smear correction, and hue/chromaticity processing.

The JPEG compression/expansion processing circuit 507 can perform JPEG compression processing on the digital image signal processed by the second image processing circuit 506 before the digital image signal is stored in the flash memory 150. The JPEG compression/expansion processing circuit 507 can read a JPEG image from the flash memory 150 and expand the read JPEG image.

Figure 4:
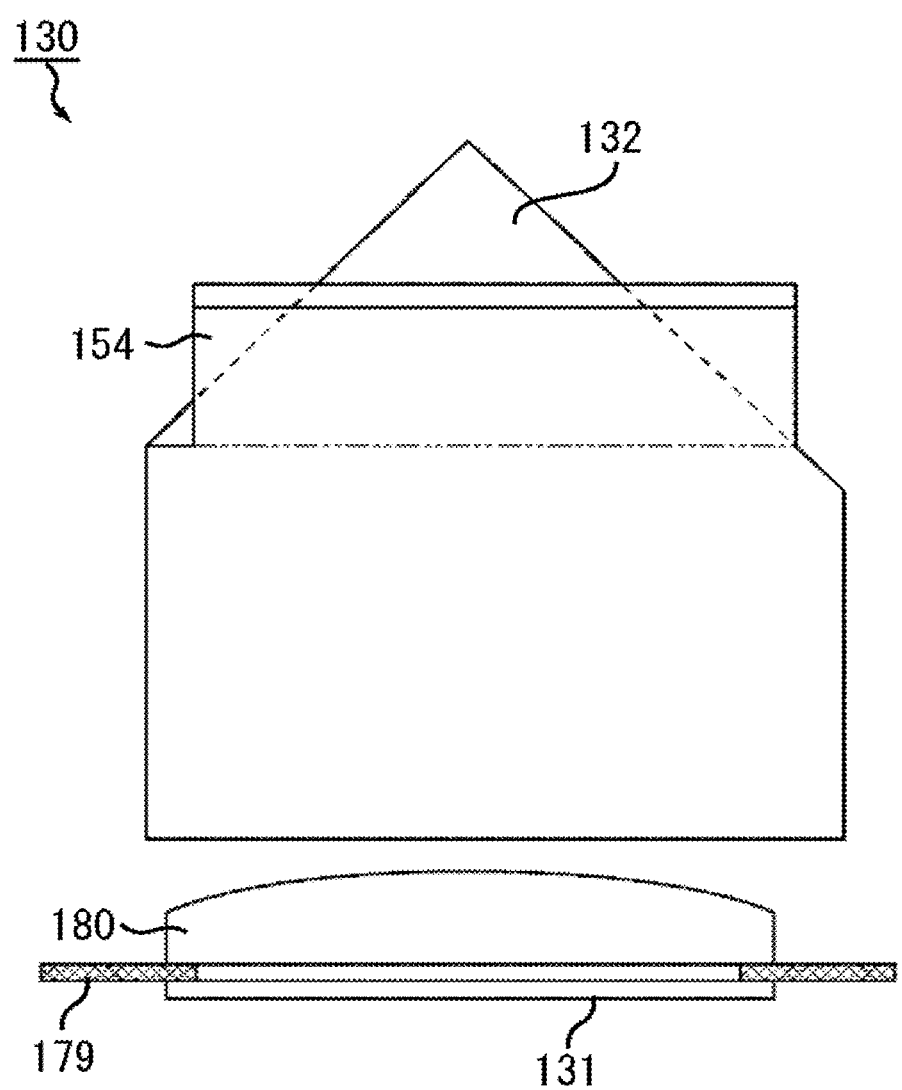
FIG. 4 is a side view illustrating a configuration of the finder apparatus as seen from a direction indicated by an arrow A in FIG. 3.

FIG. 3 is a cross-sectional view illustrating a configuration of the finder apparatus 130. FIG. 4 is a side view illustrating the configuration of the finder apparatus 130 as seen from a direction indicated by an arrow A in FIG. 3.

The focusing screen 131, a condenser lens 180, and the pentagonal prism 132 are provided on the optical path reflected and branched by the movable mirror 124 illustrated in FIG. 1.

The object light, i.e., the light image-formed on the focusing screen 131 via the lens groups (i.e., the lens groups 121, 167, and 123) of the photographic lens 120, then passes through the condenser lens 180 and the pentagonal prism 132 and exits from a surface 132b. The light further travels toward the eyepiece window 168 that is surrounded by an eye-cup 186.

In this case, the object light passes through a dichroic mirror 182 and reaches, via the eyepiece lens 133 (i.e., three lenses 133a, 133b, and 133c), a photographer's eye surrounded by the eye-cup 186 in a state where the photographer views the object via the eyepiece window 168. The object light re-forms an image on a retina of the photographer's eye.

A mirror 184 reflects light emitted from an organic EL display element 185. The reflected light passes through a dioper adjustment lens 183 and is reflected by the dichroic mirror 182 toward the eyepiece window 168. A field mask 179 has a rectangular aperture that indicates a range of a subject image that can be captured by the image sensor 127.

When a photographer views the finder, the photographer can recognize the distance measuring position information 197 (see FIG. 7) that is superposed on the subject image in the field mask 179.

A light beam 192 from the LCD display area 108e of the LCD 108a enters a pentagonal prism 132 and exits from the surface 132b of the pentagonal prism 132 toward the eyepiece window 168.

However, part of the light may be reflected in the eyepiece lens 133a and again enter the pentagonal prism 132 and may reach the focusing screen 131. In this case, the light-metering sensor 156 may detect a brightness of the light beam 192a that has returned from the eyepiece lens 133a in addition to a brightness of the subject image having passed through the photographic lens 120.

Therefore, the detection accuracy of the subject luminance information required for the exposure control may deteriorate. In other words, a light-metering result may become brighter than an actual value of the subject luminance.

Hence, in a case where the light-metering sensor 156 is used for a light-metering operation, the present exemplary embodiment performs control for adjusting the display luminance in the second display area 190d or stopping the display in the second display area 190d in order to prevent the detection accuracy of the light-metering sensor 156 from deteriorating.

Although the influence caused by the reflection from the eyepiece lens 133a positioned in the vicinity of the pentagonal prism 132 is described above, similar reflections may occur in other eyepiece lenses 133b and 133c.

Figure 5:
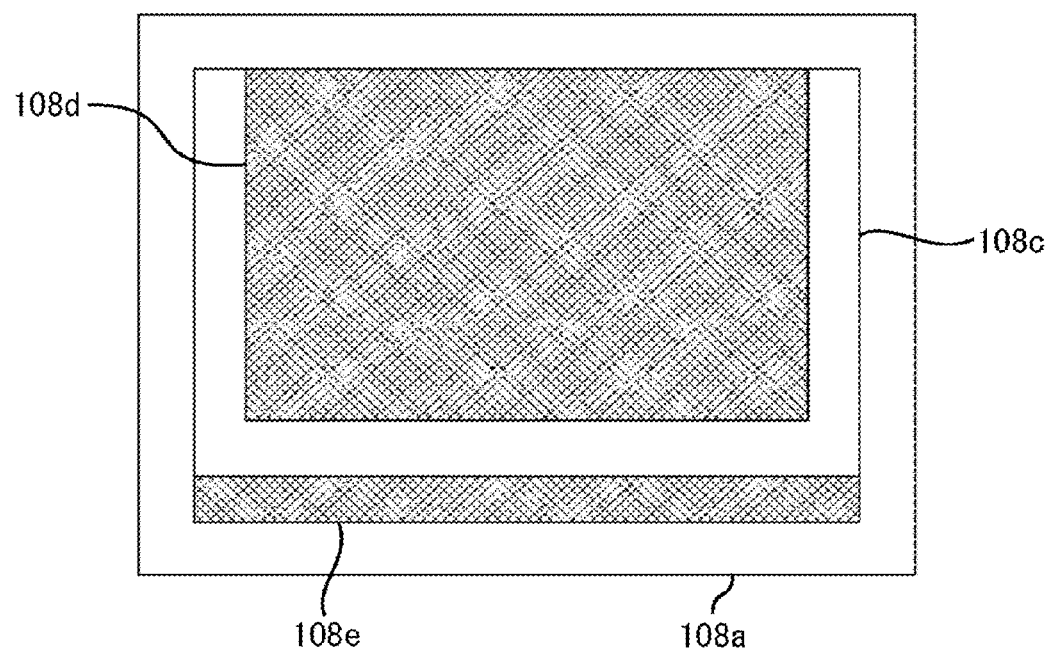
FIG. 5 illustrates a screen of a liquid crystal display (i.e., LCD) device.

FIG. 5 illustrates a screen of the LCD 108a of the liquid crystal display device 108.

The LCD 108a of the liquid crystal display device 108 includes a color display portion 108c that has an aspect ratio of 4:3. The display portion 108c can provide an LCD display area 108d and an LCD display area 108e, which can be used for electronic image display in a finder field. The LCD display area 108d has an aspect ratio of 3:2, which is similar to that of the image sensor 127. The LCD display area 108e has a flat shape extending in the horizontal direction.

A light beam 193 from the LCD display area 108d of the LCD 108a enters the pentagonal prism 132 from the surface 132b of the pentagonal prism 132. The light beam 193 becomes a light beam 192 in the pentagonal prism 132. The light beam 192 refracts and changes its traveling direction. The light beam 192 is next incident on a surface 132a (i.e., a surface on which silver vaporization is applied).

The light beam 192 reflects on the surface 132a and enters the prism 154. The prism 154 is bonded to the pentagonal prism 132. The light beam 192 further reflects on the surface 154a (i.e., a surface to which the silver vaporization is applied). Then, the light beam 192 reflects on the surface 154b (i.e., a surface to which silver vaporization is applied). The surface 154b of the prism 154 is continuously extending from the surface 132a of the pentagonal prism 132. Then, the light beam 192 exits from the surface 132b of the pentagonal prism 132 and travels toward the eyepiece window 168.

As described above, a reflection optical path can be configured in the prism 154. An optical path length from the eyepiece lens 133 to the LCD display area 108d becomes substantially equal to an optical path length from the eyepiece lens 133 to the focusing screen 131. The diopter of the LCD display area 108d substantially accords with the diopter of the focusing screen 131.

It is useful that the surface 154a of the prism 154 has an adequate curvature to accurately equalize the diopter of the LCD display area 108d with the diopter of the focusing screen 131.

In this case, even when the surface 154a is a flat surface, the diopter of the LCD display area 108d is not so different from the diopter of the focusing screen 131. Therefore, the curvature of the surface 154a maybe a weak value. Although the reflection optical path of the surface 154a constitutes a decentered system, deterioration in optical aberrations can be ignored.

Figure 6A:
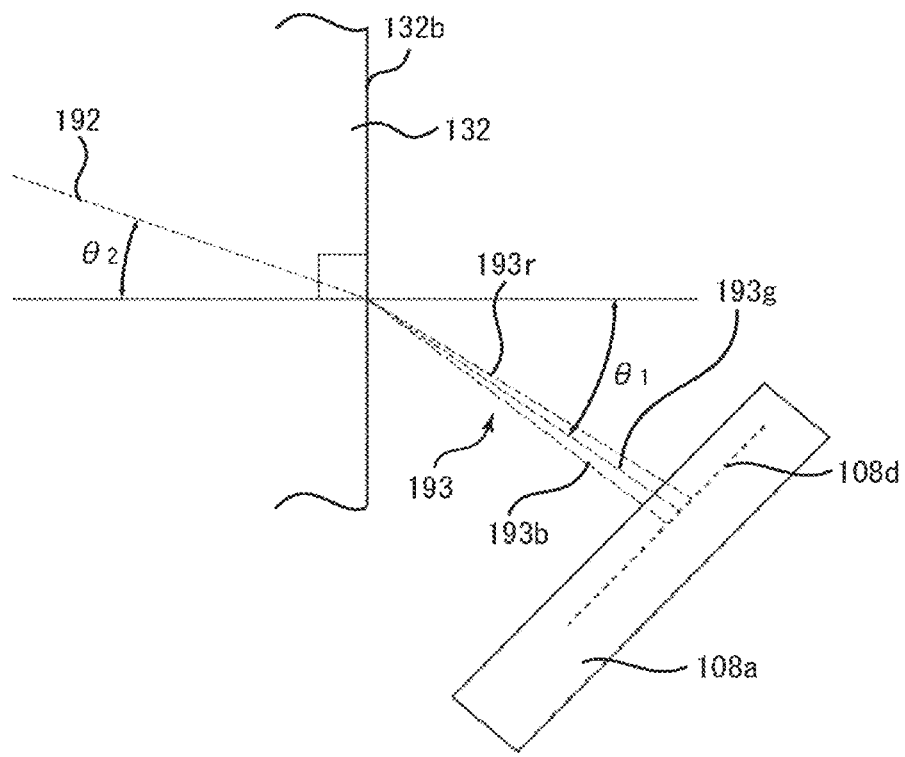
FIG. 6A illustrates an incidence state of a light beam that enters a pentagonal prism.

FIG. 6A illustrates an incidence state of the light beam that enters the pentagonal prism 132.

A green light beam 193g (i.e., part of the light beam 193) from the LCD display area 108d of the LCD 108a is obliquely incident on the surface 132b of the pentagonal prism 132 at an angle θ1. The green light beam 193g refracts on the air-glass interface and travels in the pentagonal prism 132 at an angle θ2.

In general, the relationship between the angle θ1 and the angle θ2 is variable depending on the wavelength of light due to the chromatic dispersion caused by the refractive index of the glass. If it is used for the electronic image display, undesirable vertical color bleeding is generated in the LCD display area 108d. Therefore, an obtained image has a deteriorated resolution. The present exemplary embodiment eliminates this drawback by shifting the electronic images (i.e., RGB images) to be displayed on the LCD display area 108d beforehand according to the positional deviation generated by the chromatic dispersion.

Figure 6B:
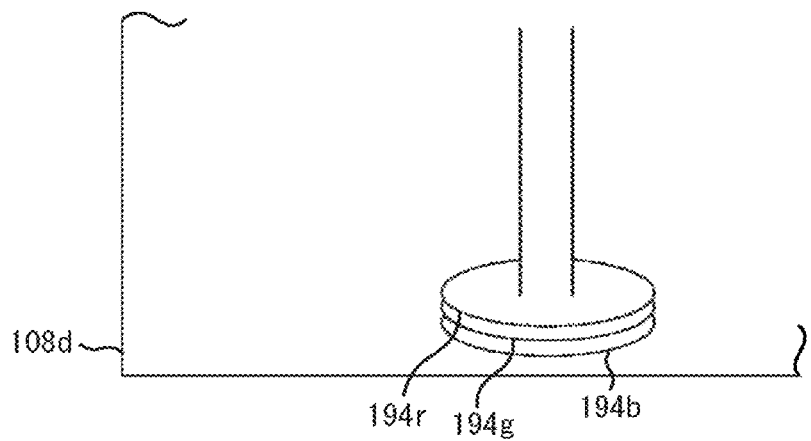
FIG. 6B illustrates a positional deviation of an electronic image that may be displayed on an LCD display area.

FIG. 6B illustrates a positional deviation of an electronic image displayed on the LCD display area 108d.

In the LCD display area 108d, a red electronic image 194r, a green electronic image 194g, and a blue electronic image 194b are mutually offset in the vertical direction.

As a result, the light beams 193r, 193g, and 193b emitted from the positions corresponding to the red electronic image 194r, the green electronic image 194g, and the blue electronic image 194b are integrated as a single light beam (i.e., the light beam 192) and can travel in the pentagonal prism 132 as illustrated in FIG. 6A. Then, the light beam 192 can reach the photographer's eye in a state where the color bleeding is substantially eliminated.

A light beam 194 from the display area 108e of the LCD 108a passes through a light-guide prism 181 and enters the pentagonal prism 132 from a bottom surface of the pentagonal prism 132. Then, similar to the object light, the light beam 194 reflects in the pentagonal prism 132 and exits from the surface 132b.

Figure 7:
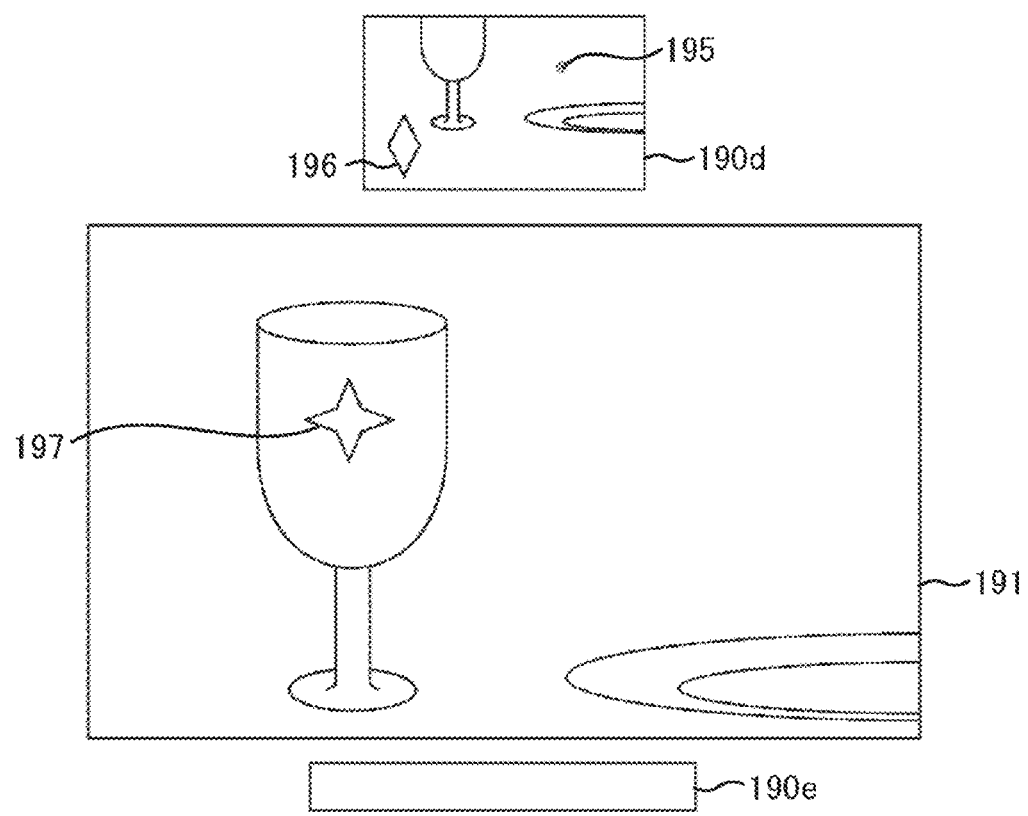
FIG. 7 illustrates images displayed in a finder field.

FIG. 7 illustrates images displayed in the finder field. The finder field includes a first display area 191, a second display area 190d, a third display area 190e, and the distance measuring position information 197. An optical image of the object regulated by the aperture of the field mask 179 is displayed in the first display area 191.

The second display area 190d is positioned above the first display area 191 and can be used to perform an information display using images based on the LCD display area 108d of the LCD 108a. The third display area 190e is positioned below the first display area 191 and can be used to perform an information display using character strings and icons based on the LCD display area 108e of the LCD 108a.

The distance measuring position information 197 is located in the first display area 191 and can be displayed by the organic EL display element 185. In this case, the luminance of each display area (i.e., the second display area 190d, the third display area 190e, and the distance measuring position information 197) can be appropriately controlled to a visually recognizable value based on an output of a light-metering apparatus that includes the light-metering sensor 156 and the light-metering lens 155.

In the present exemplary embodiment, the second display area 190d is disposed above the first display area 191 and the third display area 190e is disposed below the first display area 191.

However, the second display area 190d can be disposed at an appropriate position other than the position illustrated in FIG. 7 and similar effect can be obtained as far as the second display area 190d and the first display area 191 are separated from each other.

For example, an electronic image that maybe displayed in the second display area 190d of FIG. 7 is an image that was captured previously as one of information displays. It is understood that the electronic image illustrated in FIG. 7 includes a black point 195 because of a foreign particle adhered on the optical low-pass filter.

Users can confirm a state where a subject image is not an intended image that lacks the upper part of a subject due to an operation of the image stabilization mechanism 171, a state where an appropriate white balance is set, a state where an image is not blurred, and a state where a subject is in focus, by viewing an electronic image displayed in the second display area 190d.

Moreover, the present exemplary embodiment can simultaneously display a predetermined mark corresponding to the attribute of an image together with the image, to express information added to the image. For example, a rhombic-shaped mark 196 illustrated in FIG. 7 indicates that alteration detection data is appropriately added to the previously captured image by the image alteration detection data processing circuit 166.

If an image captured by another camera is displayed, another mark can be used to indicate an alteration detection determination result. Instead of using the liquid crystal display device 108, an organic electroluminescence display (i.e., organic EL display) may be used in the present exemplary embodiment. In this case, the backlight 108b is unnecessary.

Accordingly, when users confirm the state of an image captured by an imaging apparatus, it is unnecessary to move their eyes away from the finder while viewing an optical image. Moreover, an optical image observed in the first display area 191 does not overlap with an electronic image observed in the second display area 190d. Therefore, the present exemplary embodiment can provide a finder optical system that enables users to adequately view both an optical image and an electronic image simultaneously.

Figure 8:
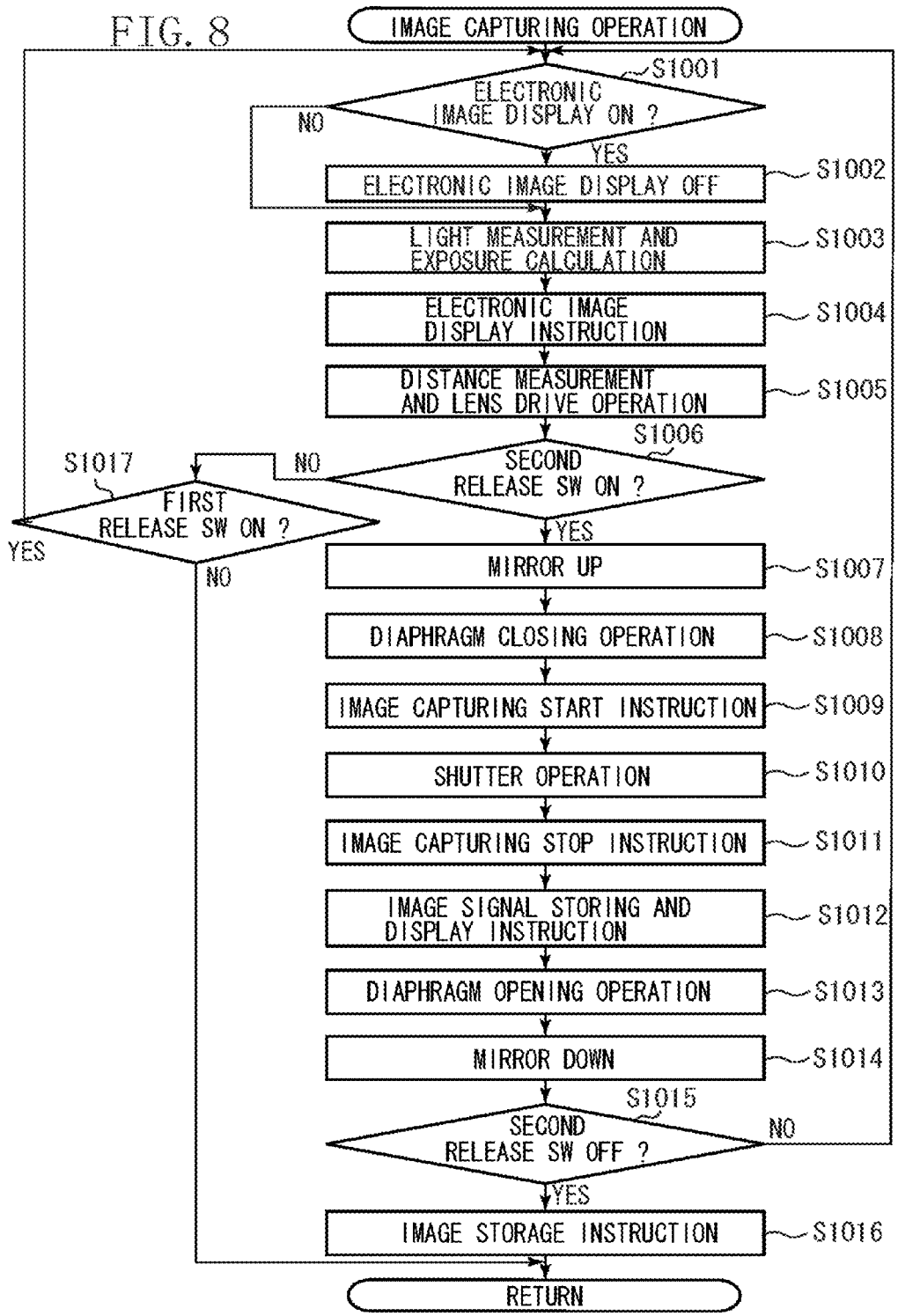
FIG. 8 is a flowchart illustrating a procedure of an image capturing operation that can be performed by the digital single lens reflex camera after a release button is half pressed.

In the digital single lens reflex camera having the above-described configuration, the CPU 141 performs various operations according to the following sequence. FIG. 8 is a flowchart illustrating a procedure of an image capturing operation that can be performed by the digital single lens reflex camera in response to a release button half-press operation (i.e., a first release on operation) of the switch input unit 142.

The flowchart illustrated in FIG. 8 is a sub routine that may be called by the CPU 141 in the main flowchart. The main flowchart to be executed by the CPU 141 is conventionally known and therefore its description is omitted.

In step S1001, the CPU 141 determines whether an electronic image is displayed in the second display area 190d before starting a light-metering operation.

If it is determined that an electronic image is displayed in the second display area 190d (YES in step S1001), the CPU 141 serves as a display control unit configured to prevent deterioration in the light-metering detection accuracy. More specifically, in step S1002, the CPU 141 stops current to be supplied to a white LED that constitutes the backlight 108b to interrupt the display of the electronic image in the second display area 190d.

The electronic image displayed in the second display area 190d is a previously captured electronic image that was processed by the CPU 141 in the following manner. Namely, the CPU 141 reads previously written image data (i.e., a digital image signal) from the flash memory 150.

Then, the CPU 141 sends a control signal to the signal processing circuit 145. The control signal instructs a display of the electronic image in the second display area 190d of the finder apparatus 130. In response to the control signal, the signal processing circuit 145 performs processing for temporarily storing the image data in the SDRAM 148 and converting the image data into a composite signal.

The signal processing circuit 145 supplies the composite signal to the liquid crystal display device 108. The liquid crystal display device 108 displays the captured electronic image on the LCD 108a. As a result, the previously captured electronic image can be displayed in the second display area 190d of the finder apparatus 130.

The CPU 141 adjusts the light quantity of the backlight 108b by changing the amount of current to be supplied to the white LED that constitutes the backlight 108b. The CPU 141 illuminates the electronic subject image displayed on the LCD 108a with an appropriate quantity of light for visual recognition based on the subject luminance (i.e., luminance information) measured beforehand.

In step S1003, the CPU 141 drives the light-metering sensor 156 to perform a light-metering using the light received via the light-metering lens 155 and measures the luminance of a subject based on an output of the light-metering sensor 156. The CPU 141 calculates an exposure quantity (i.e., diaphragm closing amount of the diaphragm mechanism 122, shutter speed of the shutter 126, and image sensor sensitivity) based on the obtained luminance information according to a predetermined calculation program.

In step S1004, the CPU 141 starts supplying current to the white LED of backlight 108d, which was deactivated in S1002, to resume the display of an electronic image in the second display area 190d.

In step S1005, the CPU 141 causes the AF sensor drive circuit 137 to drive the AF sensor 129, and measures a defocus amount (i.e., a distance measurement value) of the photographic lens 120. The CPU 141 further performs a focusing operation for the lens groups (i.e., lens groups 121, 167, and 123) based on the distance measurement value.

In step S1006, the CPU 141 determines whether the release button is fully depressed by an operator of the camera. Namely, the CPU 141 determines whether the second release switch connected to the switch input unit 142 is turned on.

If it is determined that the second release switch is not turned on (NO in step S1006), then in step S1017, the CPU 141 determines whether the release button is half pressed by the operator of the camera. Namely, the CPU 141 determines whether the first release switch is turned on. If it is determined that the first release switch is turned on (YES in step S1017), the CPU 141 determines that the release button is in a half pressed state. The processing returns to step S1001.

If it is determined that the first release switch is not turned on (NO in step S1017), the CPU 141 determines that the operator of the camera has moved a finger away from the release button. Therefore, the CPU 141 terminates the processing of the sub routine illustrated in FIG. 8 and resumes the processing of the main routine in the main flowchart.

If it is determined that the second release switch is in a turned-on state (YES in step S1006), the CPU 141 determines that the release button is in a fully depressed state. Then, in step S1007, the CPU 141 causes the mirror drive circuit 136 to move the movable mirror 124 from the first position to the second position. In other words, the CPU 141 controls the movable mirror 124 to retreat from the imaging optical path.

If the mirror-up operation in step S1007 is completed, then in step S1008, the CPU 141 causes the diaphragm drive circuit 135 to perform a diaphragm closing operation of the diaphragm mechanism 122 based on the diaphragm closing amount calculated in step S1003. In step S1009, the CPU 141 sends a signal that instructs execution of an image capturing operation to the signal processing circuit 145.

In response to this signal, the signal processing circuit 145 causes the image sensor 127 to start an electric charge storing operation. In step S1010, the CPU 141 performs an opening/closing operation for the shutter 126 based on the shutter speed calculated in step S1003.

In step S1011, after completing a closing operation for the shutter 126, the CPU 141 sends a signal that instructs stoppage of the image capturing operation to the signal processing circuit 145. In response to this signal, the signal processing circuit 145 causes the image sensor 127 to terminate the electric charge storing operation.

The signal processing circuit 145 further performs analog-digital (A/D) conversion for converting an analog image signal read from the image sensor 127 into a digital image signal, and executes associated image processing.

In step S1012, the CPU 141 sends to the signal processing circuit 145 a control signal that instructs storage and display of the above-described digital image signal. In response to the control signal, the signal processing circuit 145 temporarily stores the above-described digital image signal in a continuous shooting data storage area of the SDRAM 148 in a predetermined order and performs processing for converting the data into a composite signal.

The signal processing circuit 145 supplies the composite signal to the liquid crystal display device 108. The liquid crystal display device 108 displays a captured electronic image on the LCD 108a. As a result, the electronic image can be displayed in the second display area 190d of the finder apparatus 130.

In this case, the CPU 141 adjusts the light quantity of the backlight 108b by changing the amount of current to be supplied to the white LED that constitutes the backlight 108b. Then, the CPU 141 illuminates the electronic subject image displayed on the LCD 108a with an appropriate quantity of light for visual recognition based on the subject luminance measured beforehand.

In step S1013, the CPU 141 causes the diaphragm drive circuit 135 to return the diaphragm mechanism 122 from a diaphragm closed state to a diaphragm opened state. In step S1014, the CPU 141 causes the mirror drive circuit 136 to return the movable mirror 124 to the imaging optical path (i.e., the first position). Namely, the CPU 141 performs a mirror-down operation.

In step S1015, the CPU 141 determines whether the second release switch is turned off. If it is determined that the second release switch is not in an OFF state (NO in step S1015), the processing returns to step S1001 and the CPU 141 repeats the processing of steps S1001 to S1015 until the second release switch is turned off.

In other words, the camera does not stop a continuous shooting operation unless the second release switch is turned off. The finder apparatus 130 sequentially displays captured electronic subject images like a moving image.

If it is determined that the second release switch is in a turned off state (YES in step S1015), the CPU 141 determines that the operator of the camera stops the continuous shooting operation. In this case, in step S1016, the CPU 141 instructs the signal processing circuit 145 to transfer the continuous shooting images temporarily stored in the SDRAM 148 to a predetermined storage area of the flash memory 150. Then, the CPU 141 resumes the processing of the main routine.

Figure 9:
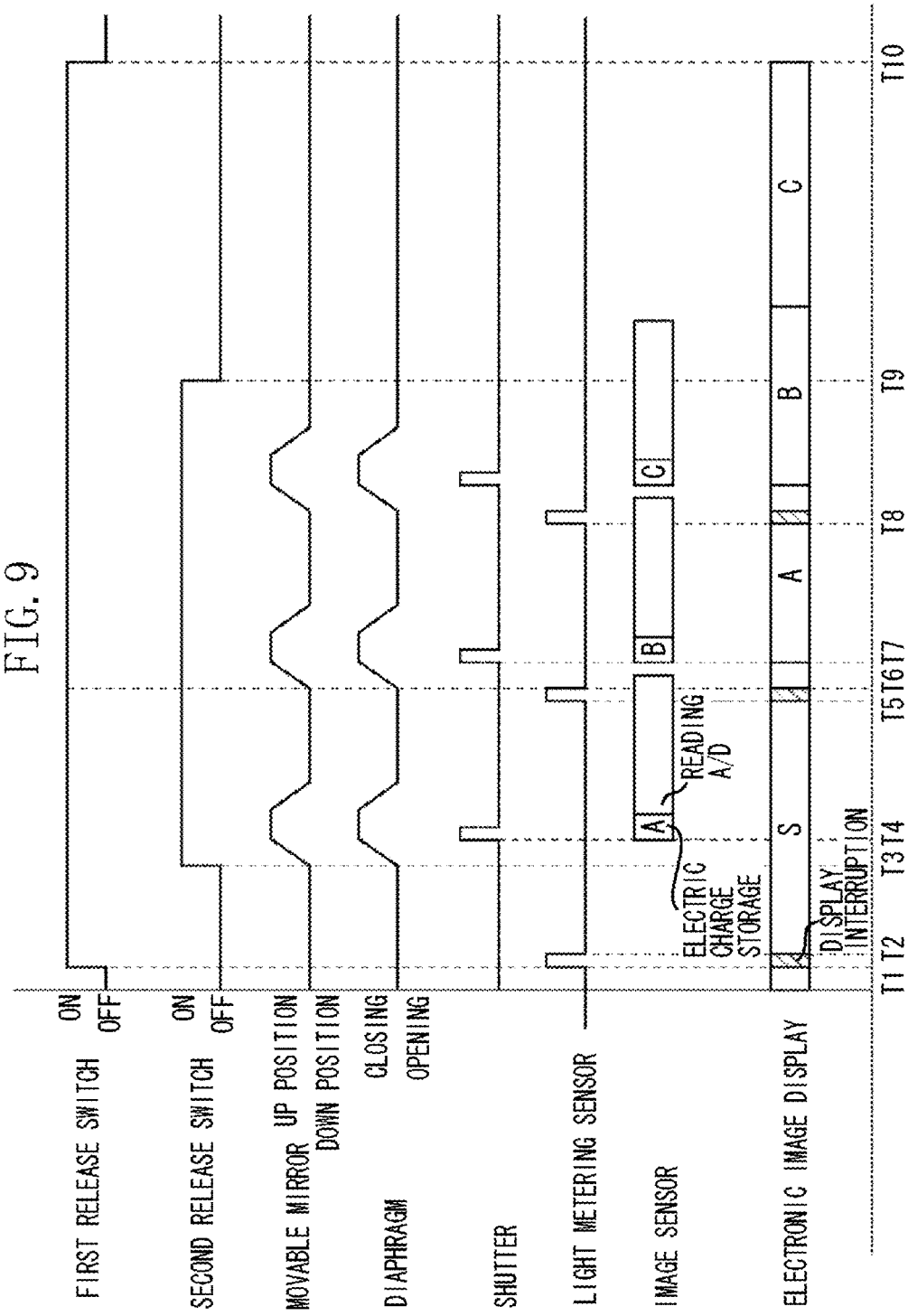
FIG. 9 is a timing diagram illustrating a camera operation based on an operation sequence of the CPU.

FIG. 9 is a timing diagram illustrating a camera operation based on the operation sequence of the CPU 141. According to the shooting operation illustrated FIG. 9, the release button is half pressed shortly and then fully pressed to capture three frames of images. Then, the release button is held in the half pressed state for a while.

First, at time T1, the first release switch changes from an OFF state to an ON state. The CPU 141 interrupts the display of an electronic image in the second display area 190d of the finder apparatus 130. The CPU 141 immediately starts the light-metering operation and the exposure quantity calculation.

At time T2, the CPU 141 terminates the light-metering operation. Then, the CPU 141 again displays a previously captured image S in the second display area 190d of the finder apparatus 130.

At time T3, the second release switch changes from an OFF state to an ON state. The movable mirror 124 moves to the up position. The diaphragm 122 of the photographic lens 120 starts closing its aperture.

At time T3, the image sensor 127 starts an electric charge storing operation for an image A. Meanwhile, the shutter 126 performs an opening/closing operation. When the shutter 126 is closed, the image sensor 127 stops the electric charge storing operation and starts reading an image signal of the image A. The read image signal is then subjected to the A/D conversion. The diaphragm 122 performs an opening operation, while the movable mirror 124 moves to the down position.

After the image signal of the image A is thoroughly read out and the A/D conversion is completed, the digital image signal is temporarily stored in the continuous shooting data storage area of the SDRAM 148 according to a predetermined order. The image data is converted into a composite signal. The converted composite signal is supplied to the liquid crystal display device 108. The LCD 108a displays the captured image A. As a result, the captured image A can be visually recognized in the second display area 190d of the finder apparatus 130.

The image S is continuously displayed in the second display area 190d of the finder apparatus 130 from time T1 until an instruction for updating the electronic image display to the image A is issued.

At time T5, the release button is held at the fully pressed state and the second release switch is in a turned-on state. The CPU 141 interrupts the display of an image in the second display area 190*d* and performs the light-metering operation and the exposure quantity calculation.

At time T6, the CPU 141 stops the light-metering operation. The movable mirror 124 again moves to the up position, while the diaphragm 122 of the photographic lens 120 starts closing its aperture.

At time T7, the image sensor 127 starts an electric charge storing operation for an image B. Meanwhile, the shutter 126 performs an opening/closing operation. When the shutter 126 is closed, the image sensor 127 stops the electric charge storing operation and starts reading an image signal of the image B. The read image signal is then subjected to the A/D conversion. The diaphragm 122 performs an opening operation, while the movable mirror 124 moves to the down position.

After the image signal of the image B is thoroughly read out and the A/D conversion is completed, the digital image signal is temporarily stored in the continuous shooting data storage area of the SDRAM 148 according to a predetermined order. The image data is converted into a composite signal. The converted composite signal is supplied to the liquid crystal display device 108.

As a result, the LCD 108*a* displays the captured image B. The captured image B can be visually recognized in the second display area 190*d* of the finder apparatus 130. The image A is continuously displayed in the second display area 190*d* of the finder apparatus 130 until an instruction for updating the electronic image display to the image B is issued.

At time T8, the release button is held at the fully pressed state and the second release switch is in a turned-on state. Then, an operation similar to the above-described operation (refer to the operations at times T5, T6, and T7) is repeated to capture an image C. The image B is continuously displayed in the second display area 190*d* of the finder apparatus 130 until an instruction for updating the electronic image display to the image C is issued.

At time T9, the release button is not fully pressed and the second release switch is turned off. The continuous shooting operation is stopped. Meanwhile, the image signal of the image C is read and subjected to the A/D conversion. The operation for updating the display of the image C is continuously performed.

At time T10, the release button is not half pressed and the first release switch is turned off. The electronic image display in the second display area 190*d* of the finder apparatus 130 is stopped.

In the above-described operation sequence, the sequential operation for reading an image signal, performing A/D conversion, storing image data in a memory (e.g., the SDRAM 148), opening the diaphragm 122, and returning the movable mirror 124 to the first position (i.e., the down position) is a shooting preparatory operation for the next frame. An operation for updating the electronic image to be displayed in the second display area 190*d* is performed in synchronization with the shooting preparatory operation.

As understood from the foregoing description, the camera according to the first exemplary embodiment enables users to observe an optical image of a subject without moving their eyes away from the finder. The electronic image displayed by the camera according to the present exemplary embodiment enables users to confirm the state of a captured image, the setting state of the camera, and photographic auxiliary information.

At the same time, an accurate light-metering result can be obtained before performing a shooting operation. Therefore, the camera can obtain photographic images as intended by users.

In the present exemplary embodiment, no current is supplied to the backlight 108C of the liquid crystal display device 108 used for displaying the second display area 190*d* when the light-metering operation is performed. Instead, it may be useful to continuously supply a small amount of current to the backlight 108C, if the current value does not exceed a threshold (i.e., an allowable limit within which the display luminance of the second display area 190*d* does not influence the light-metering accuracy).

Figure 10:
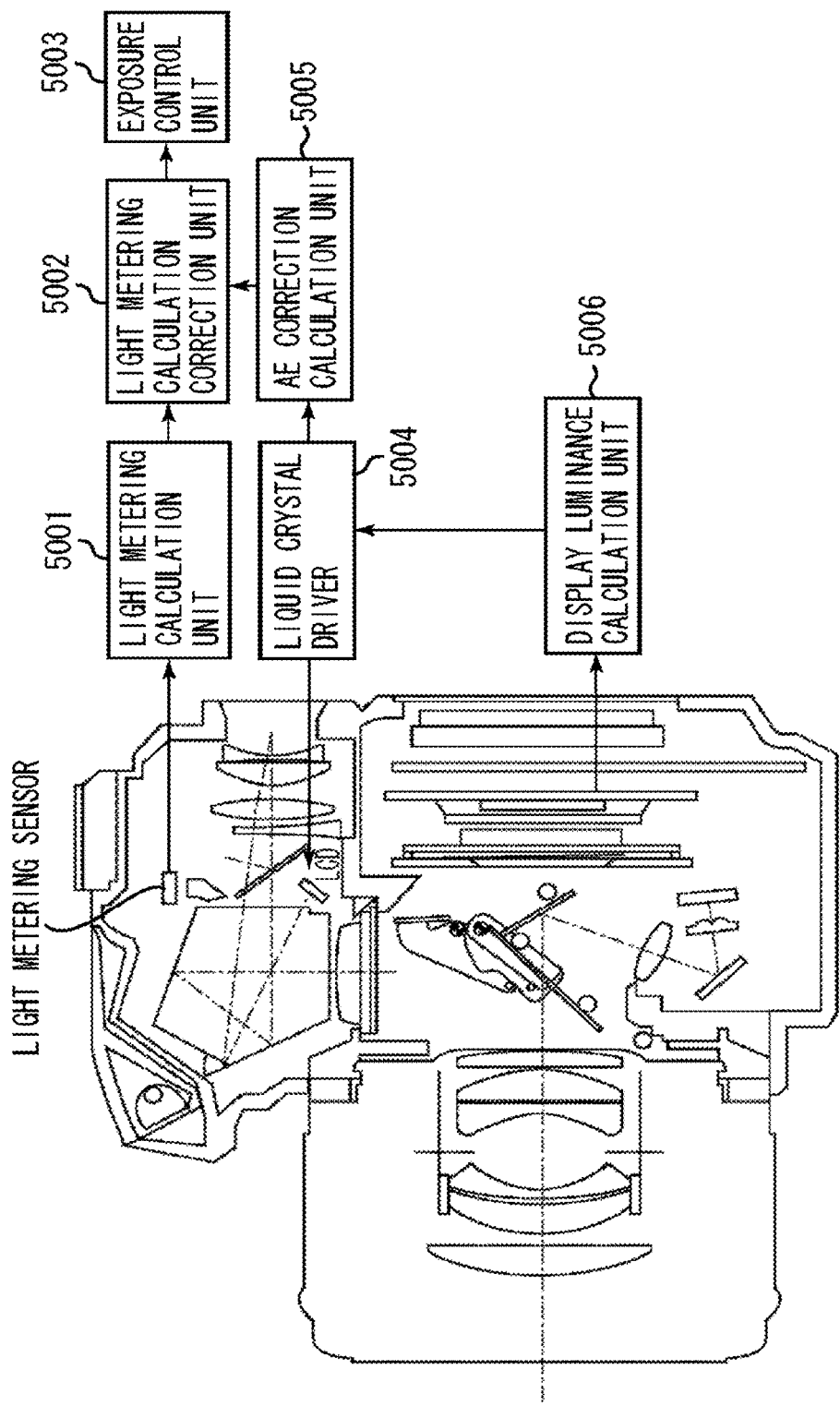
FIG. 10 is a block diagram illustrating a configuration of a part of a digital single lens reflex camera according to a second exemplary embodiment.

FIG. 10 is a block diagram illustrating a configuration of a part of a digital single lens reflex camera according to a second exemplary embodiment. FIG. 11 is a flowchart illustrating a procedure of an image capturing operation that can be performed by the digital single lens reflex camera according to the second exemplary embodiment after the release button is half pressed (i.e., when the first release switch is turned on).

Compared to the first exemplary embodiment, the second exemplary embodiment adjusts the luminance of an electronic image displayed in the second display area during the light-metering operation or corrects a detection result of the light-metering sensor 156 based on the luminance of the electronic image displayed in the second display area without adjusting the luminance.

FIG. 10 includes components and portions similar to those illustrated in FIG. 1 and therefore their descriptions are not repeated.

In FIG. 10, a display luminance calculation unit 5006 can calculate a display luminance of an electronic image captured by the image sensor 127. The display luminance calculation unit 5006 sends a calculation result to a liquid crystal display driver 5004.

The liquid crystal display driver 5004 can supply current corresponding to the calculated luminance to the backlight 108*b*. A previously captured electronic image is displayed in the second display area with a brightness corresponding to the supplied current. The luminance value controlled by the liquid crystal driver 5004 is supplied to an AE correction calculation unit 5005. The AE correction calculation unit 5005 can calculate a corrected light-metering value.

A light-metering calculation unit 5001 obtains subject luminance information, which can be used for the exposure operation, based on the light-metering result of a subject image detected by the light-metering sensor 156. In this case, as described in the first exemplary embodiment, the light of an electronic image displayed in the second display area may be reflected in the eyepiece lens 133 and may enter the focusing screen 131 again. The light-metering calculation unit 5001 may include such a reflection light beam in the calculation.

Hence, in the present exemplary embodiment, the light-metering calculation correction unit 5002 can correct the light-metering value. The light-metering calculation correction unit 5002 corrects the light-metering value based on a calculation result obtained by the light-metering calculation unit 5001 and a calculation result obtained by the AE correction calculation unit 5005. An exposure control unit 5003 determines setting values in an exposure operation (e.g., the closing amount of the diaphragm mechanism 122, the shutter speed, and the image sensor sensitivity) based on the corrected light-metering value.

A procedure in the flowchart illustrated in FIG. 11 is described below. In step S2001, the CPU 141 drives the light-metering sensor 156 and measures the luminance of a subject based on an output of the light-metering sensor 156.

In step S2002, the CPU 141 corrects the luminance value obtained in step S2001 based on luminance information of the electronic image presently displayed in the second display area. In step S2003, the CPU 141 calculates an exposure quantity (i.e., diaphragm closing amount, shutter speed, and image sensor sensitivity) based on the corrected luminance value according to a predetermined calculation program.

In steps S2004 to S2016, the CPU 141 performs processing similar to the processing performed in steps S1005 to S1017 of the first exemplary embodiment illustrated in FIG. 8. The description for these steps is not repeated.

In the above description, an adjustment of the display luminance is not performed. The correction is performed on the light-metering value. However, it may be useful to lower the display luminance of an electronic image during a light-metering operation. In this case, the effect of the lowered display luminance is taken into consideration in performing the correction on a light-metering value output from the light-metering sensor.

As understood from the foregoing description, the camera according to the second exemplary embodiment enables users to observe an optical image of a subject without moving their eyes away from the finder. The electronic image displayed by the camera according to the present exemplary embodiment enables users to confirm the state of a captured image, the setting state of the camera, and photographic auxiliary information.

At the same time, an accurate light-metering result can be obtained before performing a shooting operation. Therefore, the camera can obtain photographic images as intended by users.

A storage medium storing a software program code for realizing the functions of the above-described exemplary embodiments can be supplied to an apparatus. A computer (or CPU or micro-processing unit (MPU)) in the apparatus can read and execute the program code to realize the functions of the above-described exemplary embodiments. In this case, the program code itself read out of the storage medium can realize the functions of the above-described exemplary embodiments. The program code and the storage medium storing the program code constitute the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-174559 filed Jul. 3, 2008, which is hereby incorporated by reference herein in its entirety.

What is claimed is:

1. An imaging apparatus comprising:
    an image sensor configured to capture an image of a subject;
    a finder optical system configured to enable a photographer to optically observe the subject;
    a light-metering unit configured to perform a light-metering operation for a light flux that enters the finder optical system;
    an image display unit disposed in the finder optical system and configured to display an image of the subject captured by the image sensor and to enable the photographer to observe an image of the subject captured by the image sensor when the photographer looks in the finder optical system; and
    a correction unit configured to correct a light-metering value obtained by the light-metering unit, based on a display luminance of the image display unit.

2. An imaging apparatus comprising:
    an image sensor configured to capture an image of a subject;
    a finder optical system configured to enable a photographer to optically observe the subject;
    a light-metering unit configured to perform a light-metering operation for a light flux that enters the finder optical system;
    an image display unit disposed in the finder optical system and configured to display an image of the subject captured by the image sensor and to enable the photographer to observe an image of the subject captured by the image sensor when the photographer looks in the finder optical system;
    a control unit configured to set a lower display luminance for the image display unit when the light-metering unit performs the light-metering operation, compared to a display luminance when the light-metering unit does not perform the light-metering operation; and
    a light-metering value correction unit configured to correct a light-metering value obtained by the light-metering unit, based on a display luminance of the image display unit.

3. A method for controlling an imaging apparatus including an image sensor configured to capture an image of a subject, a finder optical system configured to enable a photographer to optically observe the subject, and an image display unit disposed in the finder optical system and configured to display an image of the subject captured by the image sensor and to enable the photographer to observe an image of the subject captured by the image sensor when the photographer looks in the finder optical system, the method comprising:
    performing a light-metering operation for a light flux that enters the finder optical system; and
    correcting a light-metering value obtained by the light-metering operation, based on a display luminance of the image display unit, when the light-metering operation is performed.

4. A non-transitory computer-readable storage medium storing a program that causes a computer to execute a method for controlling an imaging apparatus including an image sensor configured to capture an image of a subject, a finder optical system configured to enable a photographer to optically observe the subject, and an image display unit disposed in the finder optical system and configured to display an image of the subject captured by the image sensor and to enable the photographer to observe an image of the subject captured by the image sensor when the photographer looks in the finder optical system, the method comprising:
    performing a light-metering operation for a light flux that enters the finder optical system; and
    correcting a light-metering value obtained by the light-metering operation, based on a display luminance of the image display unit, when the light-metering operation is performed.

* * * * *